(12) United States Patent
Herman, Jr.

(10) Patent No.: US 6,434,444 B2
(45) Date of Patent: *Aug. 13, 2002

(54) METHOD AND APPARATUS FOR TRANSFORMING A PART PERIPHERY TO BE CUT FROM A PATTERNED SHEET MATERIAL

(75) Inventor: James S. Herman, Jr., Marblehead, MA (US)

(73) Assignee: Gerber Technology, Inc., Tolland, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/038,522

(22) Filed: Mar. 11, 1998

Related U.S. Application Data

(60) Provisional application No. 60/036,237, filed on Mar. 12, 1997.

(51) Int. Cl.[7] .............................. G06F 19/00; G06K 9/32
(52) U.S. Cl. ...................... 700/135; 700/131; 700/134; 382/111
(58) Field of Search ................................ 700/131, 134, 700/135, 143; 382/111, 170

(56) References Cited

U.S. PATENT DOCUMENTS

| | | |
|---|---|---|
| 3,805,650 A | 4/1974 | Pearl |
| 4,071,899 A | 1/1978 | Holy |
| 4,583,181 A | 4/1986 | Gerber et al. |
| 4,739,487 A | 4/1988 | Bonnet et al. ............... 700/166 |
| 4,853,866 A | 8/1989 | Galan et al. ................. 700/135 |
| 4,901,359 A * | 2/1990 | Bruder ........................ 382/111 |
| 4,905,159 A | 2/1990 | Loriot ........................ 700/134 |
| 4,941,183 A * | 7/1990 | Bruder et al. ............... 382/111 |
| 5,042,339 A | 8/1991 | Gerber |
| 5,058,174 A | 10/1991 | Carrol |
| 5,141,572 A | 8/1992 | Gerber |
| 5,172,326 A | 12/1992 | Campbell, Jr. et al. ...... 700/134 |
| 5,333,111 A | 7/1994 | Chaiken et al. |
| 5,353,355 A | 10/1994 | Takagi et al. ............... 382/111 |
| 5,412,578 A * | 5/1995 | Takagi et al. ............... 700/192 |
| 5,487,011 A | 1/1996 | Chaiken |
| 5,663,885 A * | 9/1997 | Stahl .......................... 700/134 |
| 6,173,211 B1 * | 1/2001 | Williams et al. ............ 700/131 |
| 6,240,218 B1 * | 5/2001 | Michael et al. ............. 382/289 |

FOREIGN PATENT DOCUMENTS

FR            9628985       3/1996

* cited by examiner

Primary Examiner—Leo P. Picard
Assistant Examiner—Paul Rodriguez
(74) Attorney, Agent, or Firm—McCormick, Paulding & Huber LLP

(57) ABSTRACT

A method and apparatus for cutting patterned sheet material to provide a predetermined relationship between a pattern characteristic and the part to be cut. An estimated position of a pattern characteristic is projected onto the sheet material and a distance between the estimated position and an actual position of the pattern characteristic is identified. A transforming program calculates a position for other pattern characteristic positions and cutting instructions are then created and executed.

18 Claims, 2 Drawing Sheets

METHOD AND APPARATUS FOR TRANSFORMING A PART PERIPHERY TO BE CUT FROM A PATTERNED SHEET MATERIAL

The present application claims priority to U.S. Ser. No. 60/036,237 filed Mar. 12, 1997.

FIELD OF THE INVENTION

The present invention relates to cutting parts from a patterned sheet material, and more particularly, to transforming part peripheries or markers prior to cutting, in response to a distance between a pattern characteristic projected on the sheet material at an estimated location and a corresponding actual location on the patterned sheet material.

BACKGROUND OF THE INVENTION

Upholstered furniture is generally covered with leather, vinyl or fabric. A significant part of the manufacturing cost of furniture is associated with cutting the fabric. Therefore, most inexpensive furniture is covered with vinyl, plain fabric, or fabric with a small overall pattern. When plain fabric, fabric with a small overall pattern or vinyl is used, it can be cut by placing one layer on top of another, building a stack that is then cut in a single process. For this kind of production, automatic machines are known that can stack the sheet material and then cut the stack in the required pattern pieces with a computer guided cutter.

More expensive furniture uses fabric that must be matched when applied. Examples of matching are (1) a pattern characteristic that "extends" across multiple components of a piece of furniture, such as a stripe that starts at the lower back of a sofa and continues up the back, over the top and down the seat back, across the seat and down the front to the bottom; (2) a particular pattern characteristic having a predetermined location on the finished product, such as each cushion having a particular flower centered thereon; or (3) a single pattern characteristic that is retained by adjacent furniture components, such as trees or animals that are larger than single piece of fabric in the furniture and which must appear to flow in an uninterrupted manner across two or more pieces.

Matched fabric is typically manufactured by weaving, knitting or printing. The manufacturing process usually includes passing the fabric over many rollers. As a result of the manufacturing process, the fabric typically has a skew (the filler or yarn going from one edge to the other across the web is not perpendicular to the length of the fabric), or bow (the filler yarn is not straight), or both. Moreover, the fabric is typically printed with a printing cylinder or by screen printing. With either method, the repeat of the pattern is not necessarily constant. Even if the repeat was originally perfect, the fabric may stretch as it is processed, thereby introducing error.

Accordingly, the manufactured fabric typically differs considerably from an "ideal" in terms of skew, bow and repeat.

The fabric may also have defects including, but not limited to dropped threads, holes and printing defects. Because of these many defects, patterned fabric cannot be stacked with any reliability of pattern match and must therefore be cut one layer at a time.

The most common method for matching and cutting patterned fabric includes spreading the fabric on a cutting table. A highly trained operator places or nests the individual templates of the pattern on the fabric in the appropriate places so that after cutting, sewing and upholstering the furniture, the pattern on the furniture matches in the desired configuration. After the individual templates of the pattern are in their proper place, the operator marks with chalk around each template. The pattern templates are then removed and the fabric is cut with a rotary knife or scissors.

Alternatively, an initial nest is generated by a computer program. The program can automatically position pattern pieces within a digital periphery of the fabric, or accept a manual override. Traditionally, the computer applies the nesting program to an ideal fabric pattern. In recent developments, an actual pattern of the fabric is scanned into the computer. The scanned fabric and template peripheries are then displayed on a monitor for rotation and/or translation by an operator.

After nesting is complete, the data is used to guide an automated cutting machine. Even with a scanned fabric pattern and computer generated nesting, the cutting machine instructions include moving the cutting knife to the center of the fabric pattern for each major nested group, where a stop instruction is implemented to stop the cutting machine. Once stopped, the operator can align the cutter with a particular location on the fabric pattern. That is, the operator can move the cutting machine by using a joy stick or jog buttons so that the pattern nest coincides with the actual pattern on the fabric.

U.S. Pat. No. 3,805,650 discloses the use of subprograms for individual pieces to be positionally correlated with the designs, wherein a plastic template with an index mark is manually positioned on the fabric. The index marks on the plastic template are then aligned with a pointer on the cutting head to completely identify the position of the templates by providing both location and orientation of the templates and corresponding pieces.

U.S. Pat. No. 5,172,326 discloses the use of a video camera for capturing the image of a printed fabric and displaying the captured image on a computer screen. Pattern templates are called from a memory and superimposed upon the captured pattern piece on the screen. A customized template pattern is then formed by reorientation of the pieces, and the resulting cutting instructions are forwarded to an automated cutter.

U.S. Pat. No. 4,739,487 discloses storing image coordinates of a pattern in a computer. The stored image coordinates are used to form an image and the image is projected onto the material. The operator may translate or rotate the projected image to achieve a preferred arrangement on the material.

U.S. Pat. No. 4,941,183 discloses a method of optimizing the pieces of material to be cut from a sheet including preparing a reduced scale template corresponding to the shapes of pieces to be cut; placing the templates on a projection device and projecting the images of the templates onto the material; manually positioning the templates to optimize the position of the templates; generating a digital template representation and cutting the material.

The prior art systems that are relatively inexpensive address only a specific flaw type in a pattern. Alternatively, those systems that address multiple flaws such as skew and bow require extensive image capturing equipment and are hence prohibitively expensive. Further, while the prior art systems employing scanners for acquiring an image of the patterned fabric reduce human intervention, the scanners currently have limited resolutions and may fail to identify minor flaws in the pattern. In addition, the scanners require relatively sophisticated calibration to obtain their maximum efficiency.

Therefore, the need exists for a system of adjusting a nested or individual template with respect to any of a variety of flaws on a piece of patterned sheet material. The further need exists for employing operator input to identify and adjust an estimated point projected on the sheet material to accommodate a flaw in the patterned fabric, thereby forming a distorted or shifted part periphery or template corresponding to the actual pattern on the fabric.

SUMMARY OF THE INVENTION

The present invention includes a method and apparatus for adjusting a marker or a part periphery with respect to a patterned sheet material to accommodate flaws in the sheet material such as varying repeat, bow and skew.

Generally, the present invention includes selecting a given pattern characteristic of a patterned sheet material; projecting a reference image at an estimated position on the sheet material; identifying an actual corresponding pattern characteristic and modifying the estimated position in response to a difference between the estimated position and the actual corresponding pattern characteristic. The modification of the estimated position includes a transformation of the estimated pattern characteristics in response to the identified actual pattern characteristic, thereby reducing the need to scan an entire segment of the fabric or identify and input every pattern characteristic with a given segment. The calculated difference between the ideal fabric pattern and the estimated fabric pattern is used to transform the parts to be cut from the sheet material, wherein the parts may be proximal to or spaced apart from the portion of the sheet material in which the actual corresponding pattern characteristic resides. The transformation may include a translation, rotation, distortion or any combination. As used herein, distortion includes a manipulation that changes the relative position of two locations of a part periphery. A distortion of a part periphery includes a change in the relative position of the constituent line segments. Translation and rotation retain the relative position of all the constituent line segments in a part periphery, and are therefore not a distorting manipulation.

Specifically, the present invention encompasses shifting a part periphery in response to a distance between an estimated and actual repeat frequency in the fabric, and transforming an estimated pattern or part periphery in response to an actual deviation of the patterned sheet material from an ideal pattern. The identification and inputting of the actual pattern characteristics includes projecting an estimated pattern characteristic position or part periphery upon the actual fabric. The process of projecting an estimated pattern characteristic position and adjusting its location to an actual pattern characteristic location can be implemented at spaced apart locations on the sheet material, wherein an interpolation process is applied to the intermediate area of the sheet material. Similarly, the projecting and adjusting can be implemented at adjacent locations on the sheet material and an extrapolative process is used to determine the pattern characteristics spaced from the projected area. Further, a combination of techniques may be employed depending upon the particular pattern characteristic.

DETAILED DESCRIPTION OF THE PREFERRED EMBODIMENTS

Figure 1:
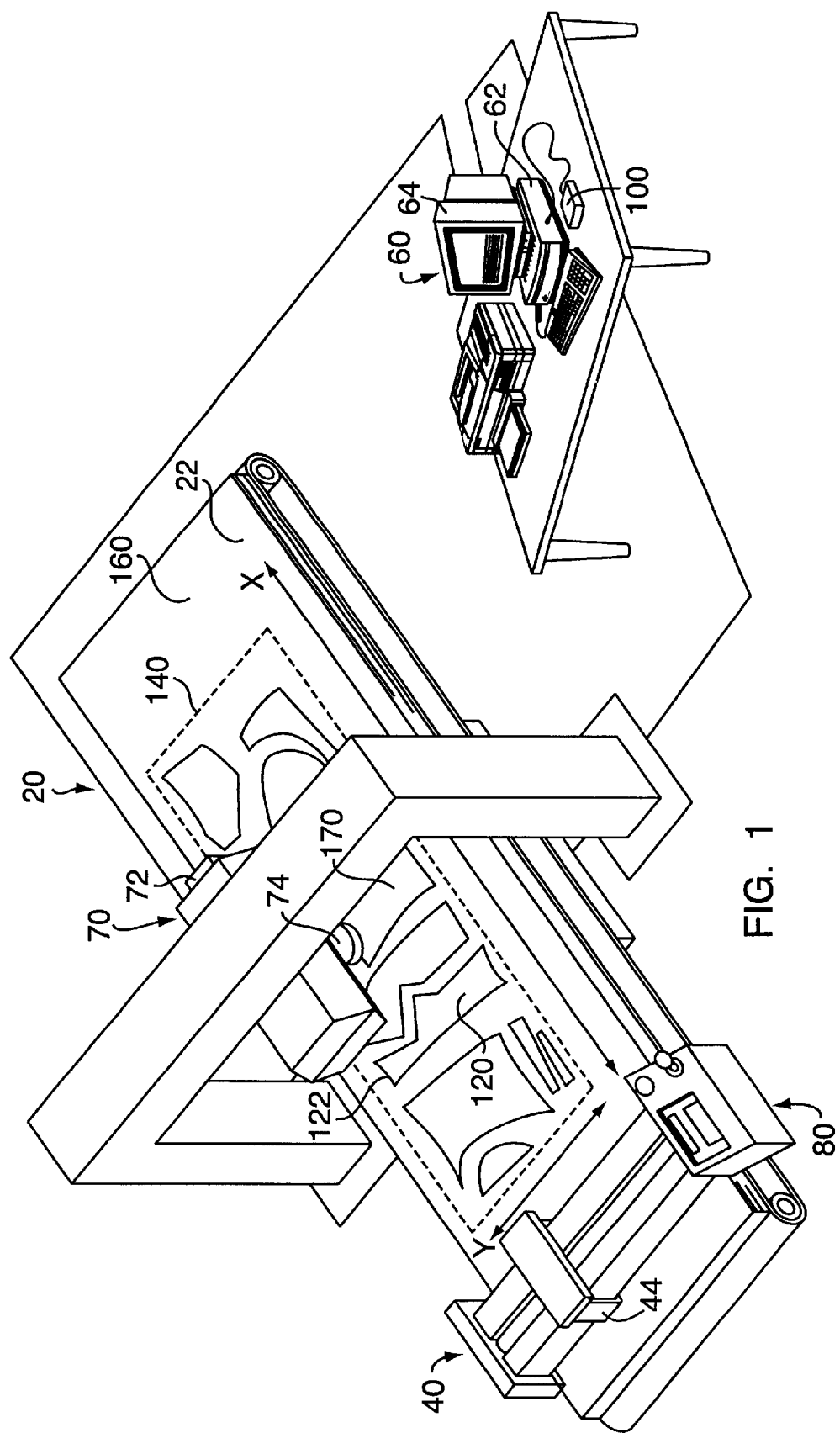
FIG. 1 is a perspective view of a cutting assembly employing the present invention.
Figure 3:
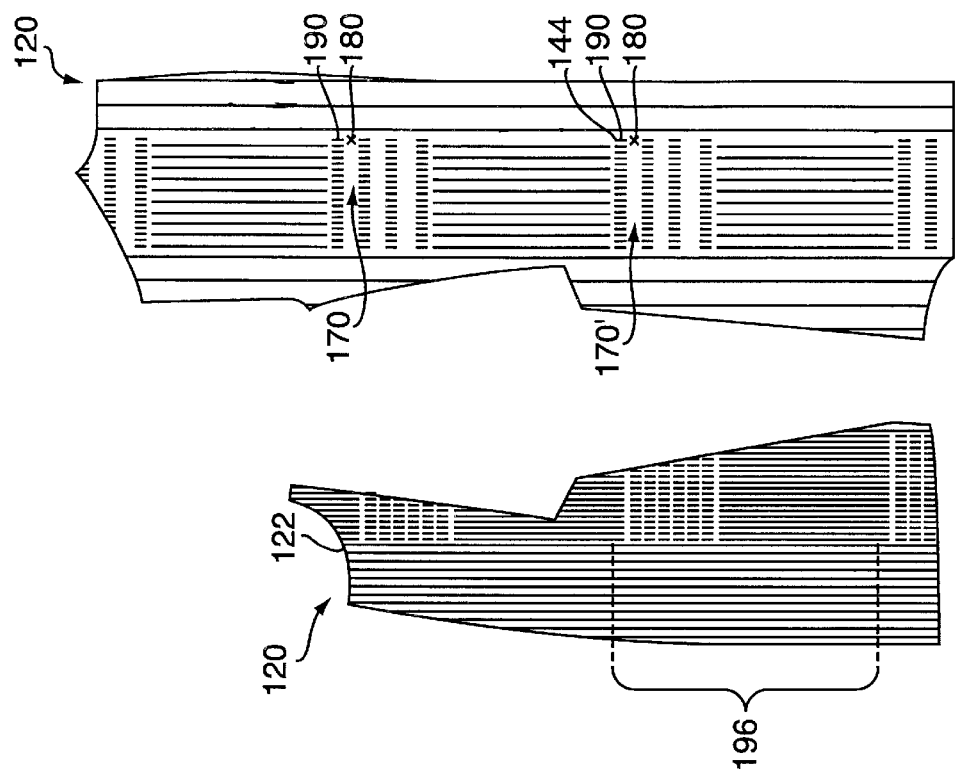
FIG. 3 is a plan view showing a segment of a patterned sheet material with part peripheries.

As shown in FIG. 1, the present system includes a cutting table assembly 20, an automated cutter 40, a controller 60, a projection system 70, an operator input device 80 and a transforming program 100.

The present method and apparatus align a part 120, part periphery 122 or marker 140 with a fabric pattern 150 on a sheet material 160, thereby allowing the use of integrated automatic marking and cutting systems so that a part may be readily cut from a patterned fabric sheet material having a flaw. As used herein, the term "marker" 140 includes any part 120, panel, piece or shape to be cut from the sheet material 160. However, it is understood that a marker 140 may include a single or multiple parts that may or may not be nested.

The present invention is particularly applicable to a patterned fabric having a pattern characteristic 152 with a repeat frequency 154. The repeating pattern characteristic 152 may be any of variety of pattern components, such as a stripe, stripe groupings, floral compositions, designs, animals, colors or any combinations. A given patterned fabric may have a plurality of repeat frequencies, depending upon the particular characteristic. That is, some pattern characteristics may repeat every inch, while other pattern characteristics repeat every twelve inches, as disclosed in U.S. Pat. No. 4,853,866 herein incorporated by reference.

The cutting table assembly 20 includes a support surface 22 upon which the sheet material 160 is spread. The support surface 22 may be in the form of a conveyor or an elongate flat table which preferably provides a multiplicity of workstations, such as a projecting/identifying station, a cutting station and a picking station. Alternatively, the support surface 22 can be in the form of a drum or inclined plane. The support surface 22 may be any of a variety of materials, but it is preferably a vacuum permeable surface that permits vacuum retention of the sheet material 160 on the support surface, as well known in the field. The specific construction and material of the support surface 22 are at least in part dictated by the type of sheet material 160 to be cut as well as the particular type of cutting assembly. As shown in FIG. 1, the system defines a longitudinal direction X of the cutting assembly and the sheet material (extending generally from the lower left to the upper right of FIG. 1) and a shorter, perpendicular direction Y of the cutting assembly and the sheet material (extending generally from the upper left to the lower right of FIG. 1).

The automated cutter 40 includes a carriage 44 or gantry movable relative to the support surface 22 for carrying a cutting implement such as a laser, knife, water jet, blade or wheel cutter. The carriage 44 and cutting implement are controlled by signals from the controller 60 to cut the sheet material 160 as retained on the support surface 22.

The controller 60 includes a computer 62 having a standard processor and may include a display 64 for displaying the image on a CRT or LCD. The computer 62 includes, or is connected to a storage device for retaining sufficient data to form the marker 140 or the periphery of parts to be cut as well as the programs for preliminary nesting and generation of cutting instructions.

A transforming program 100 runs in the controller 60 for accepting signals from an operator input device 80 to locate actual specific pattern characteristic 152 positions on a patterned sheet material 160 disposed upon the support surface 22. The operator input device 80 is operably connected to the controller 60 or computer 62 and projection system 70 and may be any of a variety of mechanisms such as a trackball, mouse, pointer or keypad.

The operator input device 80 and transforming program 100, allow a reference image 170, part periphery or segment to be transformed including a translation, rotation, distortion or any combination. The reference image 170 may be a portion of the part periphery 122, a portion of the marker 140, merely a line corresponding to the part(s) to be cut, a line corresponding to a pattern characteristic, or a point.

The program 100 allows the effective increase, decrease, or bending of a portion of the reference image 170, the projected line segment and/or adjacent line segments to generate or calculate a difference or distance between a projected estimated location(s) 180 on the sheet material 160 and an actual location 190 of the particular pattern characteristic 152. In addition, the transforming program 100 performs an interpolative process between spaced apart positions on the sheet material 160 to accommodate for variations in the sheet material between the spaced apart. The transforming program 100 may also perform an extrapolative process based upon adjacent actual pattern characteristics input, to estimate pattern characteristics at locations on the sheet material 160 that are beyond the input locations. The interpolating or extrapolating process may be any of a variety of mathematical processes such as straight line or smooth curve fitting.

The transforming program 100 generates a set of cutting instructions for controlling the automated cutter 40. The cutting instructions accommodate the difference between projected estimated pattern characteristics 180 and actual pattern characteristics locations 190. The actual pattern characteristics locations 190 are identified by the operator examining the actual sheet material 160. The difference between the estimated positions and the actual positions are then input to the controller 60 and transforming program 100 by the operator. The transforming program 100 thus obtains the actual position of the pattern characteristic 152 as well as the distance or variance from the estimated position.

The projection system 70 is operably connected to the computer 62 and includes a projector 72, preferably a laser projector and optics for projecting the reference image 170 onto the support surface 22, or sheet material 160 disposed on the support surface. The laser may be coupled to the computer display 64, if one is employed, so that the reference image 170 projected on the sheet material 160 is identical to the image on the computer display. The optics include reflective surfaces such as mirrors and lenses known in the field for directing the laser beam along an optical path to intersect the support surface 22.

The projection system 70 may employ either a coherent or incoherent light source. The control and accuracy of a coherent source render lasers a preferred source. The coherent source is a commercially available helium-neon laser. The laser is located above the support surface, and depending upon the specific structure of the system may be affixed relative to the support surface. That is, a projection path is orthogonal to support surface 22 for some locations and oblique with respect to remaining portions.

The projector 72 cooperates with an XY scanner 74 for directing the optical path. The scanner 74 is manufactured by General Scanning, Inc. A control card inserted into the computer may be used to generate an analog signal for driving the XY scanner 74. The control card is commercially available through Metrabyte and converts a digital signal into an analog signal. The controller 60 includes a shutter for selectively permitting and precluding passage of an image.

Alternatively, the projection system 70 may include a commercially available LCD projector that can be readily connected to a personal type computer.

Operation

The parts 120 to be cut from the patterned sheet material 160 are digitized in the computer memory. If multiple parts 120 are to be cut, the parts may be arranged with respect to each other and an ideal fabric pattern to form a preliminary nesting. This operation is generally known as marking and may be fully automatic or interactive, with the assistance of integrated programs. While an object of the nesting procedure is to minimize the amount of fabric required for cutting of all the parts 120, the nesting must accommodate any required match points. The ideal fabric pattern characteristics are those repeat frequencies 154 and pattern characteristic positions that would occur in a piece of perfectly formed fabric.

Match Points

A match point 144 is a specific location on the part 120 to be cut that is selected to align with a given pattern characteristic 152. That is, the match point 144 places a given portion (or point) of a pattern characteristic 152 at a predetermined location on the part 120. For example, if the sheet material 160 includes pattern having a field of red flowers with intermittent white flowers, aesthetics may dictate that a white flower be centered (or at some other predetermined location) on the final product (pillow) to dispose the white flower at the center of the pillow. After, the cutting, sewing and upholstering, the white flower must be physically located at the specific position on the piece of material that forms the front of the pillow. This specific position is designated as a match point 144, which must be accurately aligned with a particular pattern characteristic 152.

Pattern Characteristic

Figure 2:
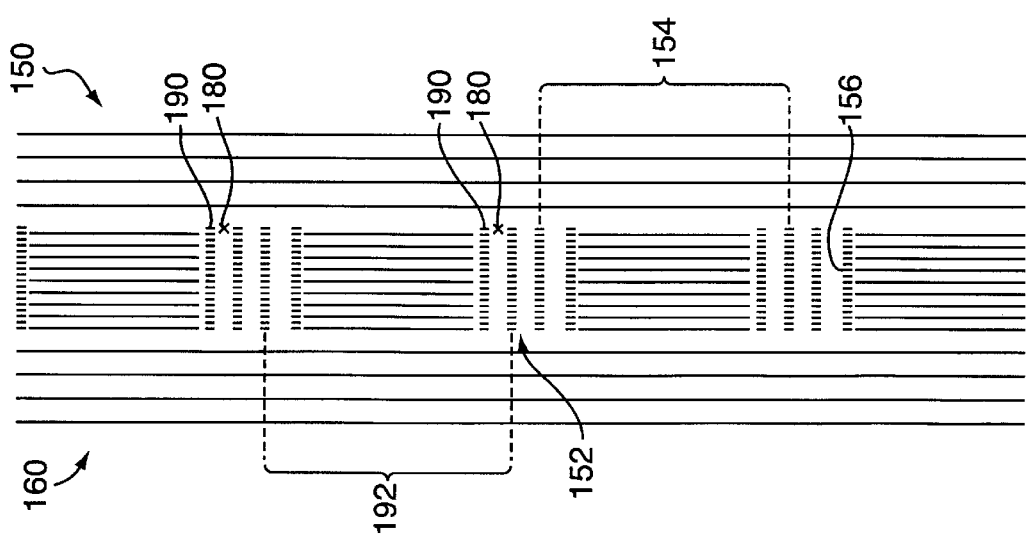
FIG. 2 is a plan view of a section of a patterned sheet material.

The match point 144 is distinguished from a pattern characteristic 152. A pattern characteristic 152 is any identifiable portion of the pattern. Generally, a pattern characteristic 152 repeats at a regular repeat frequency 192. As shown in FIG. 2, a given pattern may have a plurality of pattern characteristics 152, each having a unique repeat frequency. Some pattern characteristics may be physically large, such as wide bands or broad indicia. Alternatively, the pattern characteristic 152 may be very well defined intersections of narrow stripes or lines. A match point 144 on the sheet material 160 is a pattern characteristic 152.

In the process of marking a patterned fabric, a desired alignment between the marker 140 and the sheet material 160 is defined. The alignment includes the correspondence of a particular point in the part 120 to be cut and specific pattern characteristic 152 on the sheet material 160. That is, any match points 144 are identified and the relationship of the match point to a specific pattern characteristic 152 is created.

The alignment of the match points 144 is accomplished through the identification of a variance between an estimated position 180 of a pattern characteristic and an actual position 190 of a corresponding pattern characteristic. The variance, or distance between the position of the estimated position 180 of the pattern characteristic and the actual position 190 of the actual pattern characteristic may reside in repeat frequency variation or a distortion such as bow and skew. The identification and inputting of any variance is accomplished by projecting the reference image 170 corresponding to an estimated position of a pattern characteristic 152 onto the sheet material and directly comparing by operator inspection the estimated position of the pattern characteristic with the actual position 190 of the corresponding pattern characteristic 152 of the sheet 160, upon which the reference image is projected.

Preferably, the alignment of the marker and the sheet material 160 is accomplished before the segment of sheet material is disposed at the automated cutter 40. That is, efficiency is improved when the cutting station is not required in the alignment process. Thus, the cutter 40 may be exclusively used for cutting the sheet material 160 rather than aligning a marker 140 with the sheet material. Therefore, before the cutting operation, any preliminary nesting of parts 120 or single part to be cut is transformed to account for variations in the specific segment of fabric from which the part is to be cut.

Pattern Repeat

For accommodating repeat frequency variations of a pattern characteristic 152, an ideal repeat frequency of the pattern characteristic 152 is input into the controller 60, or computer 62, as well as an estimated location of the pattern characteristic on the sheet material. The ideal repeat frequency and corresponding location(s) may be used as first estimated positions of the pattern characteristic. A plurality of estimated positions 180 of the pattern characteristic are projected onto the sheet material 160. The estimated positions 180 of the pattern characteristic may be projected alone or in combination with a part periphery 122. The estimated positions 180 of the pattern characteristic may be all the positions for the given pattern characteristic in the specific segment of sheet material 160. Alternatively, only a subset of the total number of estimated positions 180 of the pattern characteristic within the segment may be projected. Preferably, at least two estimated positions of the pattern characteristic are projected. The projected estimated positions 180 of the pattern characteristic may be consecutive occurrences of the pattern characteristic, or spaced apart by a distance greater than the repeat frequency of the pattern characteristic.

A difference or distance between the location of the projected estimated positions 180 of the pattern characteristic 152 and the corresponding actual position 190 of the pattern characteristic is identified by visual inspection of the projection on the sheet 160 for a plurality of the projected positions of the pattern characteristic. As stated, not all the projected estimated positions 180 of the pattern characteristic 152 need to be examined. Only a subset need be identified. The variance, distance, is input into the controller 60 by the operator who inspects the segment of sheet material 160 upon which the estimated positions 180 of the pattern characteristic are projected. The operator employs the input device 80 to input into the computer 62 the distance between an estimated position 180 of a pattern characteristic 152 and the actual position 190 of a corresponding pattern characteristic. The transforming program 100 can then calculate the location of any pattern characteristics 152 intermediate of the input positions. The calculation may be an interpolation if the input pattern characteristic positions are spaced apart by a distance greater than the repeat frequency, of extrapolative if the input pattern characteristic positions are consecutive or adjacent. This interpolation or extrapolation may follow a linear or curve fitting formula, depending upon the pattern of the sheet material, the intended application of the sheet material, and the available tolerances including waste allowance. The program then adjusts the marker in response to the identified differences and the shifted part periphery is then cut.

For example, with a patterned fabric, a specific pattern characteristic 152 is associated with a match point 144. This pattern characteristic 152 is designated as a match point characteristic 156. An estimated position 180 of the match point characteristic 156 is projected onto a segment of the sheet material 160. Depending upon the fabric and the particular match point characteristic, there may be on the order of 10 or more occurrences within the segment of the sheet material 160. The system projects a number of estimated positions 180 of the match point characteristic 156 onto the sheet material 160 when the sheet material is not at the cutting station.

As the controller 60 created the projected estimated positions 180 of the match point characteristic 156 projected estimated positions. An operator then inputs the actual location 190 of the corresponding actual pattern characteristic 152 for the projected estimated match point characteristic. The operator visually inspects the projections on the sheet material 160, identifies a location of a corresponding match point characteristic 156 and employs the input device 80 to communicate to the controller 60 the distance between the projection and the match point characteristic. Preferably, the operator inputs the location of at least two of the actual match point characteristics 156. The match point characteristics 156 may be consecutive occurrences in the patterned fabric or the positions may be spaced apart by a distance greater than the repeat frequency.

The transforming program 100 then calculates, by extrapolation (if the points are consecutive) or interpolation (if the points are spaced apart greater than the respective repeat frequency), the position of a remaining match point characteristic 156 based upon the input actual locations and adjusts the position of the remaining estimated match points.

Pattern Repeat Relocation onto the Sheet Material

The present system also accommodates those situations in which the estimated position of the match point characteristic may fall outside of, or off the sheet material. For example, a part 120 may have an associated match point outside of the part periphery 122. That is, the configuration of the part 120 or the particular pattern of the sheet material 160 may provide that the match point is not within the part periphery 122. In certain nestings, the particular part periphery 122 may be nested adjacent to an edge of the sheet material 160. Upon this nesting, the corresponding match point may lie off the sheet material 160. Thus, upon inspection of the sheet material 160 the projected reference image 170 does not appear on the sheet material. The controller 60, the input device 80 and transforming program 100 are employed such that an off edge reference image 170 may be shifted by an estimated (or actual) repeat of the pattern characteristic to locate the reference image on the sheet material. The controller 60 may be programmed to relocate an estimated position that would be initially projected outside the periphery of the sheet material 160 to within the periphery of the sheet material. In the relocation of the estimated position, the controller 60 moves the estimated position by repeat frequencies until the reference image 170 is located within the periphery. The repeat frequency may be an assumed perfect frequency, or a calculated frequency. Further, the projection of the reference image 170 may be suppressed until the reference image is calculated to be within the periphery of the sheet material.

Once the reference image 170 is on the sheet material 160, the operator may adjust the position of the reference image to correspond to the actual location 190 of the pattern characteristic.

Pattern Flaws and Distortions

To address sheet material flaws such as bow and skew, the present invention includes projecting the reference image 170 onto the sheet material 160, wherein the reference image includes a plurality of points 180 estimated to correspond to unique actual pattern characteristic positions 190. A number of actual pattern characteristic positions 190 proximal to the projected reference image 170 that correspond to the estimated positions 180 are identified by visual operator inspection and input into the controller 60 via the input device 80. A distance or vector between each of the projected estimated positions 180 and the actual reference positions 190 is calculated, and a part periphery 122 is modified in response to the calculated distances. The controller 60 thus is able to calculate a local distortion of the ideal pattern characteristic in the area of the projected reference image. The transforming program 100 may adjust the relevant part periphery, or a local area of the sheet material to account for the input variance.

The present invention further includes the projection of a second reference image 170' wherein the same procedure of projecting, identifying (inspecting), inputting and calculating is conducted. The second reference 170' image may be projected substantially proximal to the first image (with a pattern characteristic repeat frequency), or in a remote segment of the sheet material. With two input reference image variations, the transforming program 100 is able to calculate an amount of pattern characteristic transformation, such as rotation or distortion necessary to translate from the first to the second projected reference image 170, 170'. The program 100 then applies the calculated transformation to the marker. It is understood that the use of adjacent reference images 170, 170' or lines within the pattern characteristic repeat frequency 154 results in an extrapolative process and the use of spaced apart reference images results in an interpolative process by the program 100. As in the repeat frequency analysis, the extrapolation and/or interpolation may be under any of a variety of regimes, such as linear or smooth curve fitting.

Estimated Grid

Alternatively, the transformation of the marker 140 may be achieved through the use of a reference point, or points, lines or line segments which form a portion of an estimated grid 196. The grid 196 incorporates the match point characteristic 156 by either directly associating a match point characteristic with a point on the projected grid or employing a match point characteristic that is a fixed predetermined distance from a point on the grid. As used herein, the term "grid" includes the direct association of a match point characteristic and the grid.

Preferably, the estimated grid 196 is composed of a plurality of perpendicular intersecting lines which are projected onto the sheet material 160. The input device 80 and projection system 70 allow the operator to manipulate the projected estimated grid 196 including a distortion, shifting or rotation to nearly align at least a portion of the projected grid with a corresponding pattern characteristic. That is, if the patterned fabric exhibits a skew, the lines of the projected grid 196 are moved to represent the skew of the fabric. Preferably, the transforming program 100 controls the projection of the grid 196 and in combination with the operator input device 80 allow portions of the projected estimated grid to be displaced or moved relative to each other, thereby conforming or aligning the projected periphery with the actual patterned fabric.

The operator examines the projected estimated grid 196 and the actual pattern characteristics positions 190 on the sheet material 160. The actual fabric pattern characteristics positions 190 on the sheet material 160 are identified by the operator. A distance between a portion of the projected estimated grid 196 and the actual corresponding pattern characteristic 190 is thus input into the computer 62 by the operator via the input device 80. A laser pointer may be positioned at a point on the projected grid 196 and this location entered into the computer 62 and the laser pointer is then positioned at the actual corresponding pattern characteristic on the fabric and this location is entered into the computer.

Alternatively, if the projected estimated grid 196 includes an estimated position of a match point characteristic 156, the match point characteristic may be identified by the operator and the projected grid distorted to align the estimated match point position and the corresponding actual match point characteristic. The operator input device 80 allows the operator to select or isolate a given portion of the projected estimated grid 196, which may include a match point 144, or be fixed with respect to a match point. The image of the projected estimated grid 196 is then dragged across the fabric pattern until the operator aligns the estimated match point with the corresponding match point characteristic. The program 100 then distorts the portion of the grid and/or adjacent portions of the grid 196.

Upon the necessary transformation of the projected estimated grid 196, the controller 60 determines a vector representing the difference between the estimated pattern characteristic or grid and the actual pattern characteristic position to calculate a transformation vector or matrix. The dimensions or parameters defining the transformation are applied to the marker 140 to be cut, thereby forming a set of cutting instructions.

Longitudinal

The projected reference image 170 or the estimated grid 196 may include a longitudinally extending component that can be manipulated in response to a fabric distortion that extends parallel to a length of the fabric, along the X direction. The projections for accommodating bow and skew distortions run perpendicular to the length of the fabric. That is, across the Y dimension FIG. 1. In contrast, the longitudinal component of the projected reference image 170 or the estimated grid 196 runs parallel to the X axis in FIG. 1.

Further, it is contemplated the present system can be applied to a first pattern characteristic for identifying and calculating a vector representing the difference between the estimated and actual pattern characteristic positions 180, 190, wherein the transformation is then applied to a second different pattern characteristic that was not actively measured.

While prior devices capture and store the image of the fabric to be cut, the present invention does not require any system hardware to obtain the image, but rather projects an estimate onto the fabric pattern of a sheet material 160. The operator is able to employ the input device 80 to input a variance or distance between the estimated point 180 and the corresponding actual point 190, or transform portions of projected grid 196 to align projected estimated positions with corresponding actual pattern characteristic positions on the fabric. Therefore, the digitized part peripheries, markers, are distorted in response to fabric flaw input data from the operator. The digitized part peripheries are distorted without having to be displayed on either the fabric or a display device such as a computer screen.

Further, the present invention permits the creation of a marker with only a real match point. The real match point may be spaced from the corresponding part periphery. Parts having relative match points are identified by following the linking of parts and match points to the parent match point. Often the parent match point will be spaced from the corresponding part.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

I claim:

1. A method of calculating an estimated position of a third occurrence of a pattern characteristic on a patterned sheet material having repeating occurrences of the pattern characteristic, comprising:
   (a) projecting a first reference image onto the sheet material at a first estimated position of the pattern characteristic;
   (b) visually inspecting the sheet material and the projected first reference image to identify a corresponding first pattern characteristic position;
   (c) identifying a difference between the first reference image on the sheet material at the first estimated position and the corresponding first pattern characteristic position;
   (d) projecting a second reference image onto the sheet material, the second reference image including a second estimated position of the pattern characteristic;
   (e) visually inspecting the sheet material and the projected second reference image to identify a corresponding second actual pattern characteristic position;
   (f) identifying a difference between the second reference image on the sheet material at the second estimated position and the corresponding second pattern characteristic position; and
   (g) calculating a position of a third occurrence of the pattern characteristic based upon a difference between the first estimated position and the first actual pattern characteristic position, and the second estimated position and the second actual pattern characteristic position.

2. The method of claim 1, wherein calculating the position of the third occurrence includes one of a linear interpolation and linear extrapolation.

3. The method of claim 1, wherein calculating the position of the third occurrence includes one of a curve fitting interpolation and curve fitting extrapolation.

4. A method of identifying a fabric repeat characteristic in a patterned sheet material, comprising:
   (a) projecting a first estimated pattern characteristic position onto the sheet material;
   (b) identifying a first actual pattern characteristic position corresponding to the first estimated pattern characteristic position;
   (c) projecting a second estimated pattern characteristic position onto the sheet material spaced apart from the first estimated pattern characteristic position;
   (d) identifying a second actual pattern characteristic point corresponding to the second estimated pattern characteristic position; and
   (e) calculating a pattern characteristic repeat frequency for a portion of the sheet material intermediate the first and the second actual pattern characteristic positions.

5. The method of claim 4, wherein calculating a pattern characteristic repeat frequency includes interpolating a portion of the sheet material intermediate two identified spaced apart actual pattern characteristic positions.

6. The method of claim 5, wherein interpolating includes one of a linear and smooth curve fitting interpolation.

7. The method of claim 4, wherein calculating a pattern characteristic repeat frequency includes extrapolating a portion of the sheet material spaced apart from two adjacent identified actual pattern characteristic positions.

8. The method of claim 7, wherein extrapolating includes one of a linear and smooth curve fitting extrapolation.

9. The method of claim 4, further comprising creating a revised pattern characteristic repeat frequency based upon the calculated pattern characteristic repeat frequency for a portion of the sheet material.

10. A method of associating an estimated pattern characteristic position and an actual pattern characteristic position located on a sheet material having a periphery, comprising:
    (a) identifying a reference image of an estimated pattern characteristic position located outside the periphery of the sheet material;
    (b) moving the reference image by one of an estimated pattern characteristic repeat and an actual pattern characteristic repeat to locate the reference image within the periphery of the sheet material; and
    (c) projecting the reference image within the periphery of the sheet material.

11. A method of transforming an estimated pattern characteristic for a sheet material in response to a patterned sheet material having a pattern characteristic, comprising:
    (a) disposing a first segment of the patterned sheet material upon a support surface;
    (b) selecting a first pattern characteristic occurring in the first segment;
    (c) projecting a reference image onto the first segment at an estimated position of the first pattern characteristic;
    (d) visually inspecting the sheet material and the projected reference image to identify a corresponding pattern characteristic position proximal to the projected reference image;
    (e) identifying a difference between the projected reference image at the estimated position and the corresponding pattern characteristic position proximal to the projected reference image; and
    (f) calculating a local transformation of the estimated pattern characteristic, the local transformation corresponding to the identified difference between the projected reference image at the estimated position and the corresponding pattern characteristic position proximal to the projected reference image.

12. A method of transforming an estimated part periphery relative to a patterned sheet material, comprising:
    (a) projecting an estimated position of a pattern characteristic and an estimated pattern distortion onto the sheet material including a pattern sheet bow and as pattern sheet skew in the estimated pattern distortion;
    (b) identifying by visual operator inspection of the sheet material a first vector relating the projected estimated position of the pattern characteristic to a unique actual pattern characteristic position, and a second vector relating the estimated pattern distortion to an actual pattern distortion; and
    (c) transforming the estimated part periphery in response to the identified vectors.

13. The method of claim 12, wherein the pattern characteristic is a match point characteristic.

14. The method of claim 12, further comprising simultaneously cutting a transformed part periphery and projecting an estimated position of a second pattern characteristic onto the sheet material.

15. The method of claim 14, further comprising simultaneously presenting a cut transformed part periphery at a picking station.

16. A method of transforming and distorting an estimated pattern for a sheet material in response to a patterned sheet material having a repeating pattern characteristic, comprising:

(a) disposing a first segment of the patterned sheet material upon a support surface;

(b) projecting a reference image onto the first segment at an estimated position of a first pattern characteristic, the reference image including an estimated fabric distortion including one of a bow and a skew;

(c) visually inspecting the first segment of the patterned sheet material to identify an actual fabric distortion;

(e) transforming the estimated pattern for the sheet material in response to the identified difference.

17. The method of claim 16, wherein transforming the estimated pattern in response to the identified difference includes adjusting the projected reference image to correspond an estimated fabric position to an actual fabric position.

18. An apparatus for transforming an estimated pattern for a sheet material in response to a patterned sheet material, comprising:

(a) a database containing coordinate information of a part periphery and a reference point corresponding to the patterned sheet material;

(b) a projector for projecting the part periphery and the reference point onto the sheet material;

(c) an input device for entering offset data representing a difference between the projected reference point and a corresponding point on the sheet material; and (d) a controller operably connected to the database and the projector for determining a pattern characteristic position in response to the offset data, the controller selected to at least locally distort the estimated pattern for the sheet material in response to the difference between the projected reference point and a corresponding point on the sheet material.

* * * * *